A1

United States Patent
Singh et al.

(10) Patent No.: US 11,303,726 B2
(45) Date of Patent: Apr. 12, 2022

(54) METHOD AND SYSTEM FOR DETECTING AND PREVENTING ABUSE OF AN APPLICATION INTERFACE

(71) Applicant: Oath Inc., New York, NY (US)

(72) Inventors: Markandey Singh, San Jose, CA (US); Prabhakar Kasi, Cupertino, CA (US); Suchith Chandran, Cupertino, CA (US)

(73) Assignee: YAHOO ASSETS LLC, Dulles, VA (US)

(*) Notice: Subject to any disclaimer, the term of this patent is extended or adjusted under 35 U.S.C. 154(b) by 191 days.

(21) Appl. No.: 16/111,305

(22) Filed: Aug. 24, 2018

(65) Prior Publication Data

US 2020/0068043 A1 Feb. 27, 2020

(51) Int. Cl.
*H04L 29/08* (2006.01)
*H04L 29/06* (2006.01)
*H04L 67/63* (2022.01)
*H04L 67/1001* (2022.01)

(52) U.S. Cl.
CPC ............ *H04L 67/327* (2013.01); *H04L 63/02* (2013.01); *H04L 67/1002* (2013.01)

(58) Field of Classification Search
CPC ... H04L 67/327; H04L 63/02; H04L 67/1002; H04L 43/0876; G06F 19/00
See application file for complete search history.

(56) References Cited

U.S. PATENT DOCUMENTS

| | | | |
|---|---|---|---|
| 9,009,834 B1* | 4/2015 | Ren | G06F 21/6209 726/24 |
| 2009/0070336 A1* | 3/2009 | Wiechers | G06F 16/972 |
| 2009/0106220 A1* | 4/2009 | Hayton | H04L 41/0622 |
| 2012/0151003 A1* | 6/2012 | Murray | G06F 16/2322 709/219 |
| 2013/0210388 A1* | 8/2013 | Li | H04W 52/0212 455/411 |
| 2015/0135330 A1* | 5/2015 | Schieferstein | H04L 63/04 726/26 |
| 2015/0287096 A1* | 10/2015 | Jacobsson | G06Q 30/0275 705/14.71 |
| 2016/0337253 A1* | 11/2016 | Tang | H04L 47/28 |
| 2018/0063264 A1* | 3/2018 | Papakostas | H04L 67/22 |
| 2019/0342379 A1* | 11/2019 | Shukla | G06F 16/2272 |

FOREIGN PATENT DOCUMENTS

EP 3026602 A1 * 6/2016 ............. G06N 20/00

* cited by examiner

*Primary Examiner* — Christopher B Robinson
(74) *Attorney, Agent, or Firm* — Venable LLP

(57) ABSTRACT

The present teaching relates to a method and system for reducing request traffic directed to a server. Upon receiving a request associated with an application in a time-window, an identifier that is to be associated with the request is generated. A first criterion associated with the request is evaluated based on the identifier, and the request is transmitted to a server based on a second criterion related to the time-window and the first criterion.

20 Claims, 14 Drawing Sheets

METHOD AND SYSTEM FOR DETECTING AND PREVENTING ABUSE OF AN APPLICATION INTERFACE

BACKGROUND

1. Technical Field

The present teaching generally relates to the Internet. More specifically, the present teaching relates detecting and preventing the occurrences of abnormal events.

2. Technical Background

The explosive use of web-based applications for conducting business on the Internet has brought to focus the problem of overload situations to which the web servers are generally subjected to. Web servers often experience such overload situations due to the extremely bursty nature of Internet traffic, popular online events or malicious attacks. Such overload situations significantly affect performance and may result in lost revenue.

Typically, remotely located Internet applications make multiple calls to a server via some application interface (API). Such calls are usually triggered by interaction of a user with an application that is executed on a client device. Often times, due to a bug in an application code or the manner in which the user interacts with the application, the application ends up making more calls to the API than required. In such scenarios, the API may be overloaded with calls (i.e., requests) and may cause the server to eventually lock out the client device.

The process of locking out client devices is usually helpful in an actual abuse scenario, in which the calls to the server are intentionally generated by the user e.g., in a malicious attack scenario. However, if calls are unintentionally generated, either by the application or the user, then the locking out of the client device by the server results in lowered user experience. FIG. 1 depicts a web application that is executed on a client device 101. The client device 101 may communicate with a server 109 via a network 105 and an API 107. The client device 101 may transmit a request to the API 107 to gain access to the server in order to obtain data stored in a database 111. In scenarios where the web application results in making a large number of requests to the API, the client device may be locked out for a predetermined amount of time e.g., 1-2 hours. However, if the requests are unintentional in nature, then such scenarios result in a poor user experience.

Accordingly, there is a requirement for developing a framework that detects and prevents unintentional requests made to the API, thereby reducing a call volume to the server and preventing unintentional application lock-out.

SUMMARY

The teachings disclosed herein relate to methods, systems, and programming for detecting and preventing occurrences of abnormal events.

One aspect of the present disclosure provides for a method, implemented on a machine having at least one processor, storage, and a communication platform capable of connecting to a network for reducing request traffic directed to a server. The method includes the steps of: receiving a request associated with an application in a time-window; generating an identifier to be associated with the request; evaluating a first criterion associated with the request based on the identifier; and transmitting the request to the server based on a second criterion related to the time-window and the first criterion.

By one aspect of the present disclosure, there is provided system for reducing request traffic directed to a server. The system comprises a request handling unit and a request processing unit. The request handling unit is implemented by a processor and configured to receive a request associated with an application in a time-window, generate an identifier to be associated with the request, and evaluate a first criterion associated with the request based on the identifier. The request processing unit implemented by the processor and configured to transmit the request to the server based on a second criterion related to the time-window and the first criterion.

Other concepts relate to software for implementing the present teaching on detecting and preventing unintentional usage of an API. A software product, in accord with this concept, includes at least one machine-readable non-transitory medium and information carried by the medium. The information carried by the medium may be executable program code data, and/or parameters in association with the executable program code.

In one example, there is provided, a machine-readable, non-transitory and tangible medium having data recorded thereon for reducing request traffic directed to a server, wherein the medium, when read by the machine, causes the machine to perform a method including steps of: receiving a request associated with an application in a time-window; generating an identifier to be associated with the request; evaluating a first criterion associated with the request based on the identifier; and transmitting the request to the server based on a second criterion related to the time-window and the first criterion.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
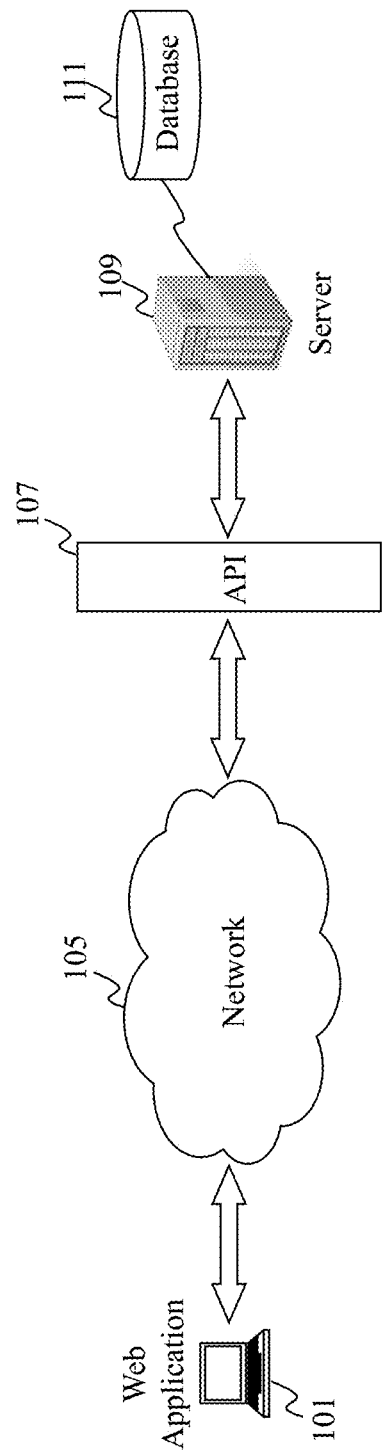
FIG. 1 (PRIOR ART) illustrates a conventional system configuration in which a web application communicates with a server.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 2:
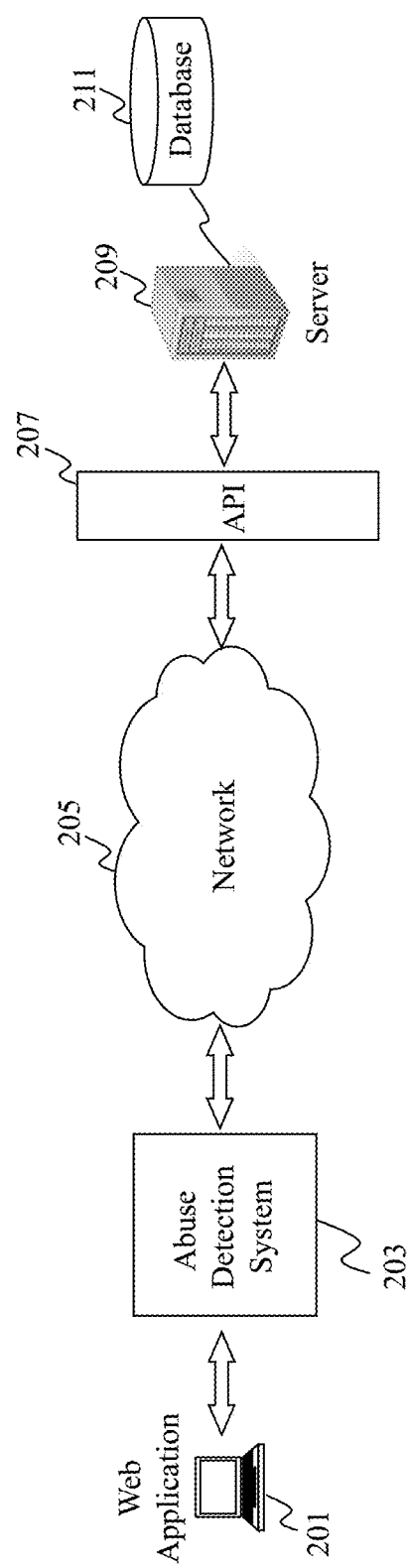
FIG. 2 illustrates an exemplary system configuration in which a web application communicates with the a server, according to various embodiments of the present teaching.

FIG. 2 illustrates an exemplary system configuration in which a web application communicates with a server, according to various embodiments of the present teaching. The system configuration as depicted in FIG. 2 includes the web application being executed on a client device 201, an abuse detection system 203, a network 205, an API 207, a server 209, and a database 211.

The client device 201 may communicate with the server 209 via a network 205 and the API 207. The network 205 may be a single network or a combination of different networks. For example, a network may be a local area network (LAN), a wide area network (WAN), a public network, a private network, a proprietary network, a Public Telephone Switched Network (PSTN), the Internet, a wireless network, a cellular network, a virtual network, or any combination thereof. A network may also include various network access points, e.g., wired or wireless access points such as base stations or Internet exchange points through which a data source may connect to the network 205 in order to transmit information via the network and a network node may connect to the network 205 in order to receive information.

In contrast to the system configuration as depicted in FIG. 1, the system configuration of the present embodiment includes the abuse detection system 203. The abuse detection system 203 processes each request initiated from the web application and determines whether the request is to be transmitted to the API 207/server 209. For example, by one embodiment, the abuse detection system 203 processes unintentional requests that may be issued either by the user of the client device 201 and/or requests issued by the web application itself to determine whether the requests are to be transmitted to the server 209. The abuse detection system 203 is configured to reduce a number of requests that are generated in an unintentional manner and directed to the server 209. Accordingly, the abuse detection system 203 prevents unintentional application lockout and provides a good user engagement experience.

Figure 3:
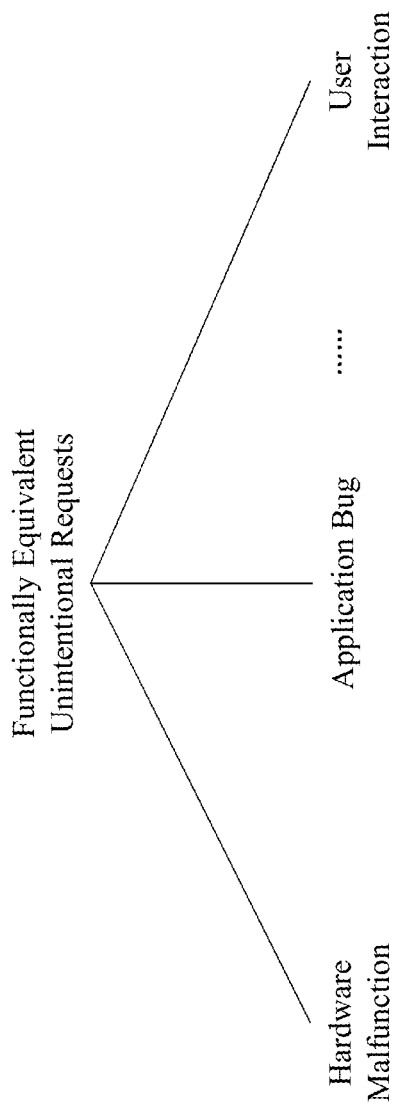
FIG. 3 depicts an illustrative graph depicting various types of unintentional requests, in accordance with various embodiments of the present teaching.

By one embodiment, unintentional requests occur due to a defect in either the hardware of the client device or the application which is executed on the client device. As shown in FIG. 3, unintentional requests may be caused due to a hardware malfunction, a user interaction with the application/device, or a bug in the application code executed on the client device. An unintentional request caused by a hardware malfunction may be for example a defective key included in the keyboard of the client device. Upon the user pressing such a malfunctioning key, the client device may generate many 'key pressing' operations in quick succession. Such operations may lead to multiple calls (i.e., requests) being issued to the API (e.g. API 207).

Unintentional requests may also be generated based on user interaction with the client device. For example, the user may accidentally or unintentionally press a particular key multiple times. As such, the web-application results issuing multiple calls (corresponding to the multiple key pressing operations) to the API. Unintentional requests may also be generated due to a bug in a code of the application that is being executed on the client device. For instance, the code may include a bug, which results in the application making several calls in quick succession to the API.

By one embodiment, the abuse detection system 203 in FIG. 2 detects unintentional requests issued from the user or the web application and processes each request to determine whether the request is to be transmitted to the API 207. The abuse detection system 203 determines whether the request is to be transmitted to the API 207 based on whether the request is a functionally equivalent request (i.e., similar requests) with respect to a previously received request. According to an embodiment, two requests are determined to be functionally equivalent requests, if the abuse detection system 203 generates a same identifier for the requests. Details regarding the abuse detection system 203 are described next with reference to FIG. 4A. Moreover, it must be appreciated that although FIG. 2 depicts a single API 207 that forms a communication channel between the web application and the server, the teachings of the present disclosure are equally applicable to the case where each web application executed on the client device may communicate with the server 209 via a unique API.

Figure 4A:
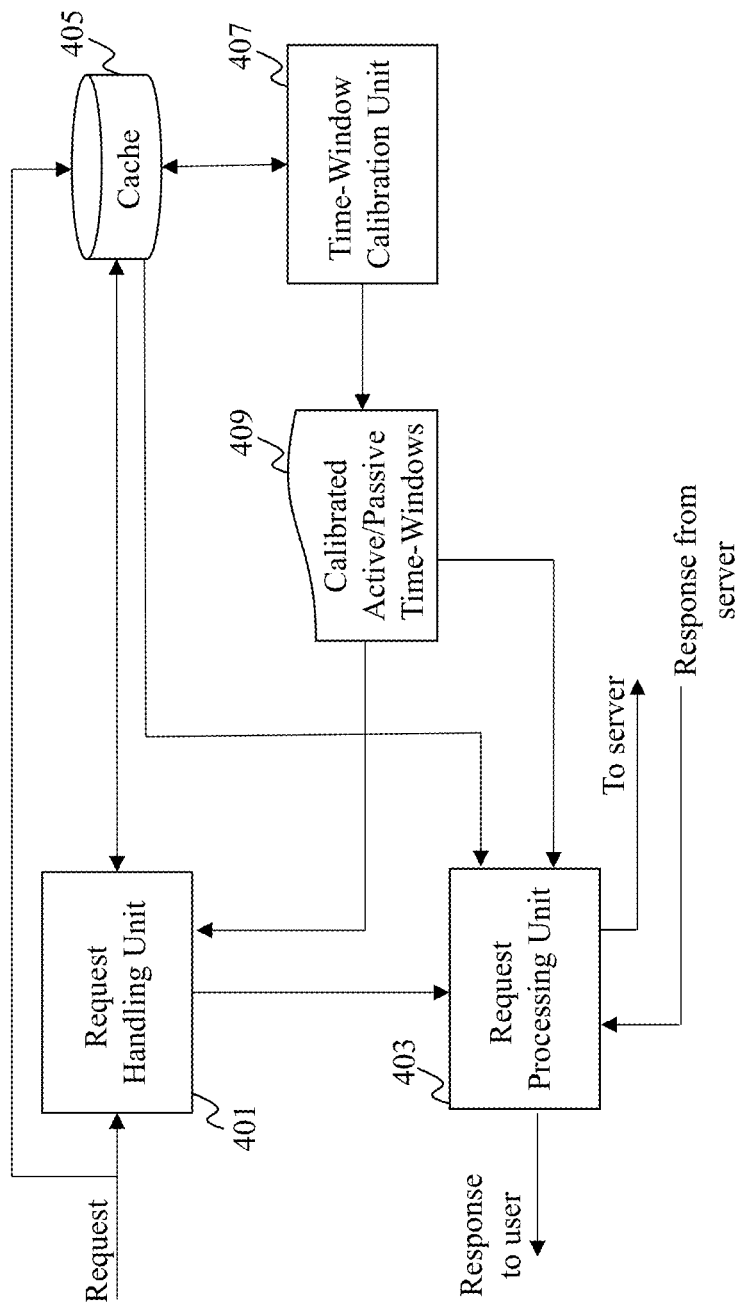
FIG. 4A depicts an exemplary abuse detection system, in accordance with various embodiments of the present teaching.

Turning to FIG. 4A, there is depicted an exemplary abuse detection system 203, in accordance with various embodiments of the present teaching. The abuse detection system 203 includes a request handling unit 401, a request processing unit 403, a time-window calibration unit 407 that is configured to generate calibrated active and passive time-windows 409, and a cache 405. A request, such as an unintentionally generated request is received by the request handling unit 401. The request handling unit 401 pre-processes the received request to generate an identifier (ID) that is to be associated with the request in accordance with an ID generating model. For instance, by one embodiment, the request handling unit 401 may generate the ID based on a string (i.e., content) included in the request. Content included in the request may correspond to content included in a URL of the request, content included in a header portion or a body portion of the request, etc. The generated ID is stored in the cache 405 along with the request. Moreover, the request handling unit 401 may determine whether the request is received in an active time-window or a passive time window based on a timestamp associated with the received request.

By one embodiment, the request handling unit 401 is further configured to determine whether the received request is a functionally equivalent request (i.e., a similar request) with respect to any one of a previously received request. The request handling unit 401 determines whether the request is a functionally equivalent request by comparing the generated ID of the request with the generated IDs of the previously received requests. If the generated ID of the request matches the generated ID of any one of the previous request that is received within a predetermined amount of time, the request handling unit 401 determines that the request is a functionally equivalent request.

Information pertaining to the request such as whether the request is a functionally equivalent request, a time-window (active/passive) in which the request is received, etc., is transmitted from the request handling unit 401 to the request processing unit 403 for further processing the request. Moreover, the request processing unit 403 also receives the calibrated active/passive time-windows from the time-window calibration unit 407. Based on criteria related to the received information, the request processing unit 403 determines whether the request is to be transmitted to a server. Additionally, the request processing unit 403 also generates a scheduled response for the request that is transmitted to the web application from which the request originated. Further details regarding the request processing unit 403 are described later with reference to FIG. 6A, while details regarding the time-window calibration unit 407 are described later with reference to FIG. 8A.

Figure 4B:
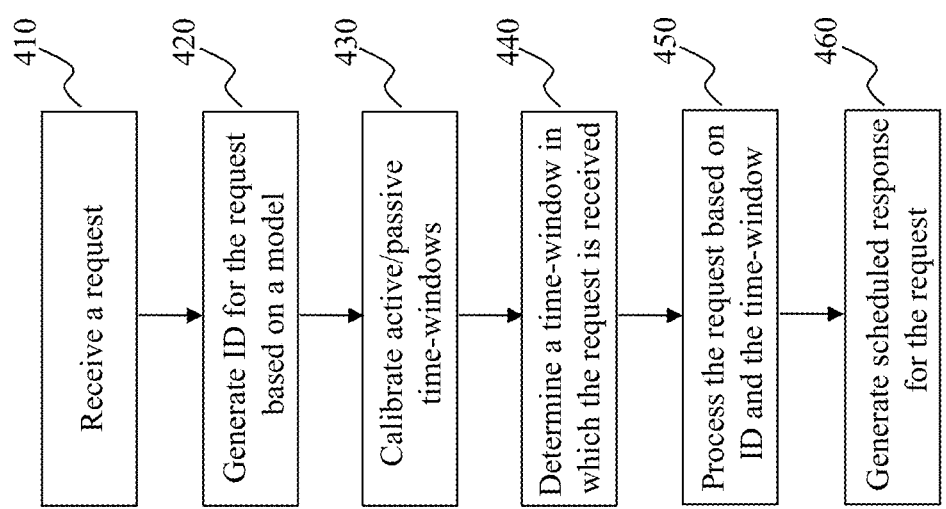
FIG. 4B depicts an illustrative flowchart of an exemplary process performed by the abuse detection system, in accordance with an embodiment of the present teaching.

FIG. 4B depicts an illustrative flowchart of an exemplary process performed by the abuse detection system 203, in accordance with an embodiment of the present teaching. The process commences in step 410, wherein a request is received by the abuse detection system. In step 420, an ID is generated for the request in accordance with an ID generating model.

In step 430, the abuse detection system calibrates active and passive time-windows. In step 440, the abuse detection system determines a time window in which the request is received. For example, based on a timestamp associated with the request, the abuse detection system 203 determines whether the request is received in the active time-window or the passive time window. In step 450, the abuse detection system 203 processes the request to determine whether the request is to be transmitted to a server based on the generated ID of the request and the time-window in which the request is received. Further, in step 460, the abuse detection system generates a scheduled response for the request, which is transmitted to the web application from where the request originated.

Figure 5A:
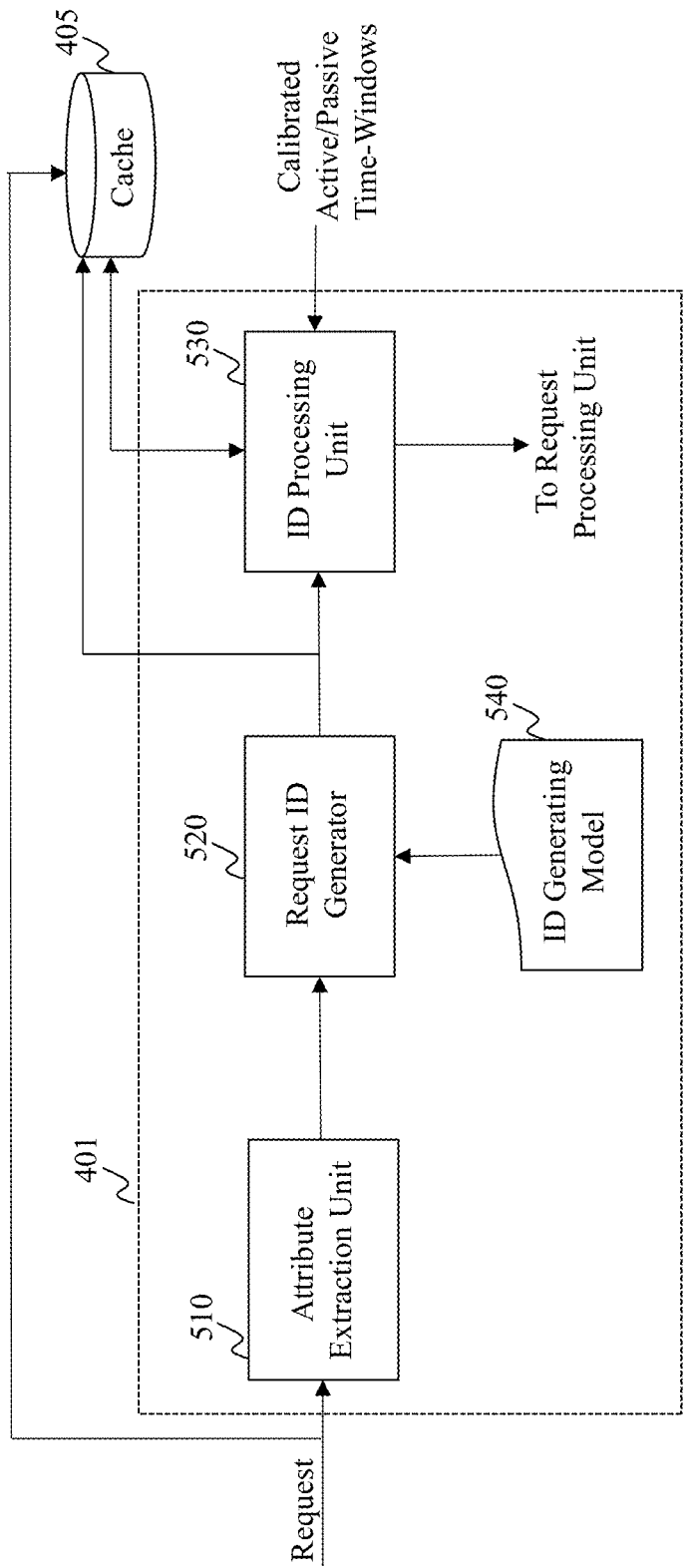
FIG. 5A depicts an exemplary request handling unit of an abuse detection system, in accordance with various embodiments of the present teaching.

FIG. 5A depicts an exemplary request handling unit 401 of an abuse detection system 203, in accordance with various embodiments of the present teaching. The request handling unit 401 includes an attribute extraction unit 510, a request ID generator 520, an ID processing unit 530, and an ID generating model 540. The attribute extraction unit 510 receives a request and extracts a certain attribute from the request. The extracted attribute may correspond to a string associated with the request. For example, the string may be a URL of the request, content in a body portion of the request, content in a header portion of the request, or the like. It must be appreciated that functionally equivalent (i.e. similar) requests have the same attributes, and thus the same ID is generated for such requests.

The request ID generator 520 generates an ID to be associated with the request. By one embodiment, the request ID generator 520 may generate the ID for the request based on the extracted attribute of the request in accordance with an ID generating model 540. For example, the ID generating model 540 may be a hashing algorithm such as a CRC-32 hash algorithm. It must be appreciated that the ID generating model 540 generates the same ID (e.g., a hash) for similar requests (i.e., functionally equivalent request) and a distinct ID for functionally distinct requests. The generated ID of the request is stored along with the request in the cache 405.

The ID processing unit 530 receives calibrated active/passive time-windows from the time-window calibration unit 407 of the abuse detection system 203. The ID processing unit 530 determines whether the request is received within a first time-window (i.e., an active time-window) or a second time-window (i.e., a passive time-window), and further compares the generated ID for the request with IDs of requests that are generated previously within a predetermined time-period. By one embodiment, the ID processing unit 530 is configured to determine, based on the generated ID of the request, whether the request is a functionally equivalent request with respect to requests that are previously received within the predetermined time-period. Note that requests that are functionally equivalent are assigned the same ID by the request ID generator 520. The ID processing unit 530 transmits information such as the ID of the request, a time-window in which the request is received, and information pertaining to whether the request is a functionally equivalent request to the ID processing unit 403 of the abuse detection system 203 for further processing.

Figure 5B:
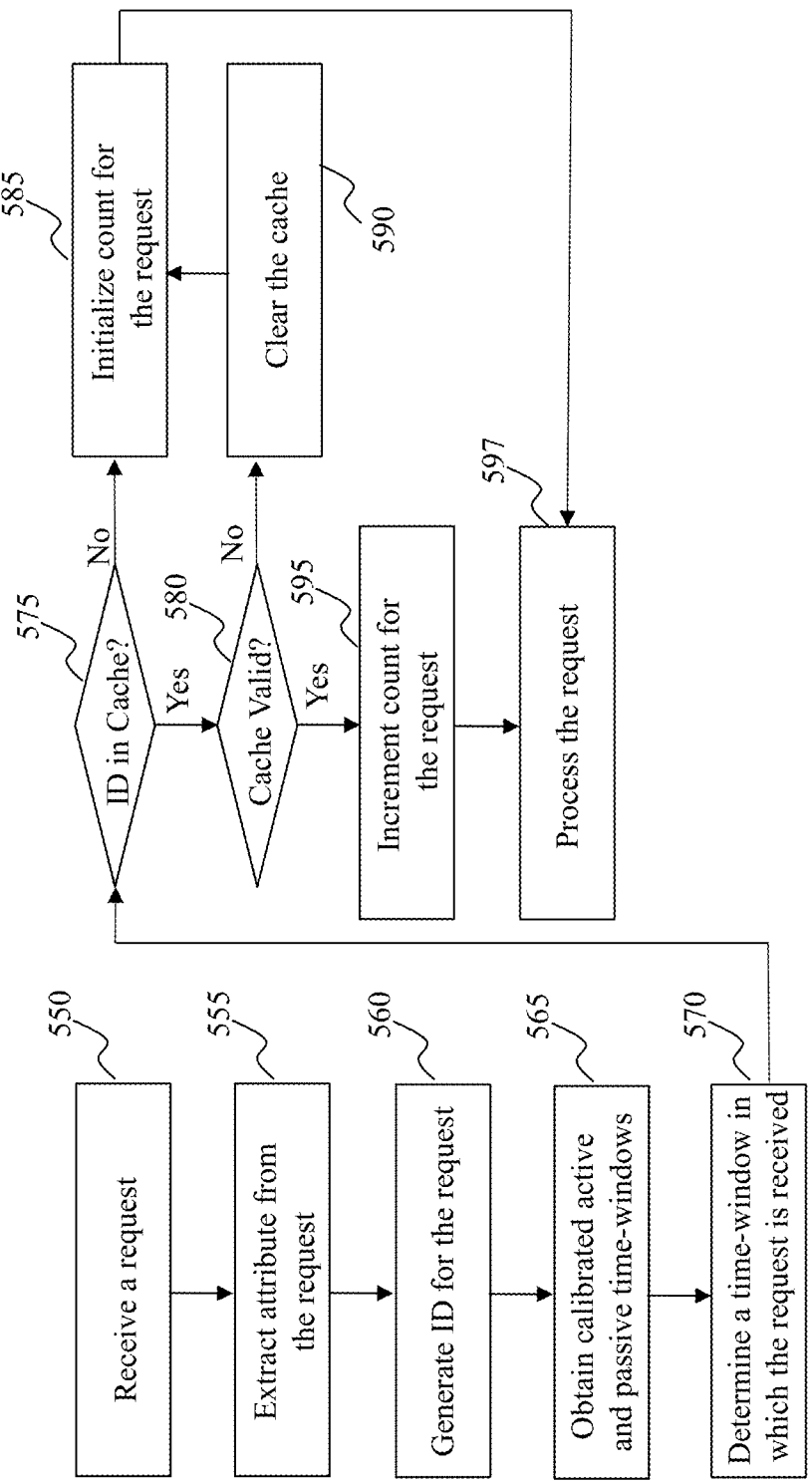
FIG. 5B depicts an illustrative flowchart of an exemplary process performed by the request handling unit, in accordance with an embodiment of the present teaching.

FIG. 5B depicts an illustrative flowchart of an exemplary process performed by the request handling unit 401, in accordance with an embodiment of the present teaching. The process commences in step 550, wherein the request handling unit 401 receives a request. In step 555, an attribute is extracted from the request. In step 560, an ID that is to be associated with the request is generated in accordance with an ID generating model.

The process in step 565 obtains calibrated active and passive time-windows. In step 570, based on a timestamp associated with the request, a time-window in which the request is received is determined. For instance, by one embodiment, it may be determined whether the request is received in the active time-window, or the passive time-window, or an after passive time-window.

In step 575 a query is performed to determine whether the generated ID of the request is present in a cache. Specifically, it is determined whether the received request is a functional equivalent of a previously received request. If the response to the query is affirmative, the process moves to step 580. If the response to the query in step 575 is negative, the process moves to step 585.

In step 580, a query is performed to determine whether the cache is valid. By one embodiment, a validity of the cache is determined by verifying whether the request is received in a given time-cycle having magnitude equal to, for instance, a sum of the active time-window and passive time-window. In other words, by one embodiment, the cache is cleared upon expiration of the passive time window which is subsequent to the active time-window. If the response to the query in step 580 is affirmative, the process moves to step 595. If the response to the query is negative, the process moves to step 590.

In step 590, the cache is cleared, where after the process moves to step 585. In step 585, a count for the request is initialized, where after the process moves to step 597. The count for the request corresponds to a number of functionally equivalent requests that have been previously received. In step 595, the count of the request is incremented by one, where after the process moves to step 597. In step 597, the request is processed based on a first criterion related to the generated ID of the request, and a second criterion related to the time-window in which the request is received. Details regarding the processing of the request are described next with respect to FIG. 6A and FIG. 6B.

Figure 6A:
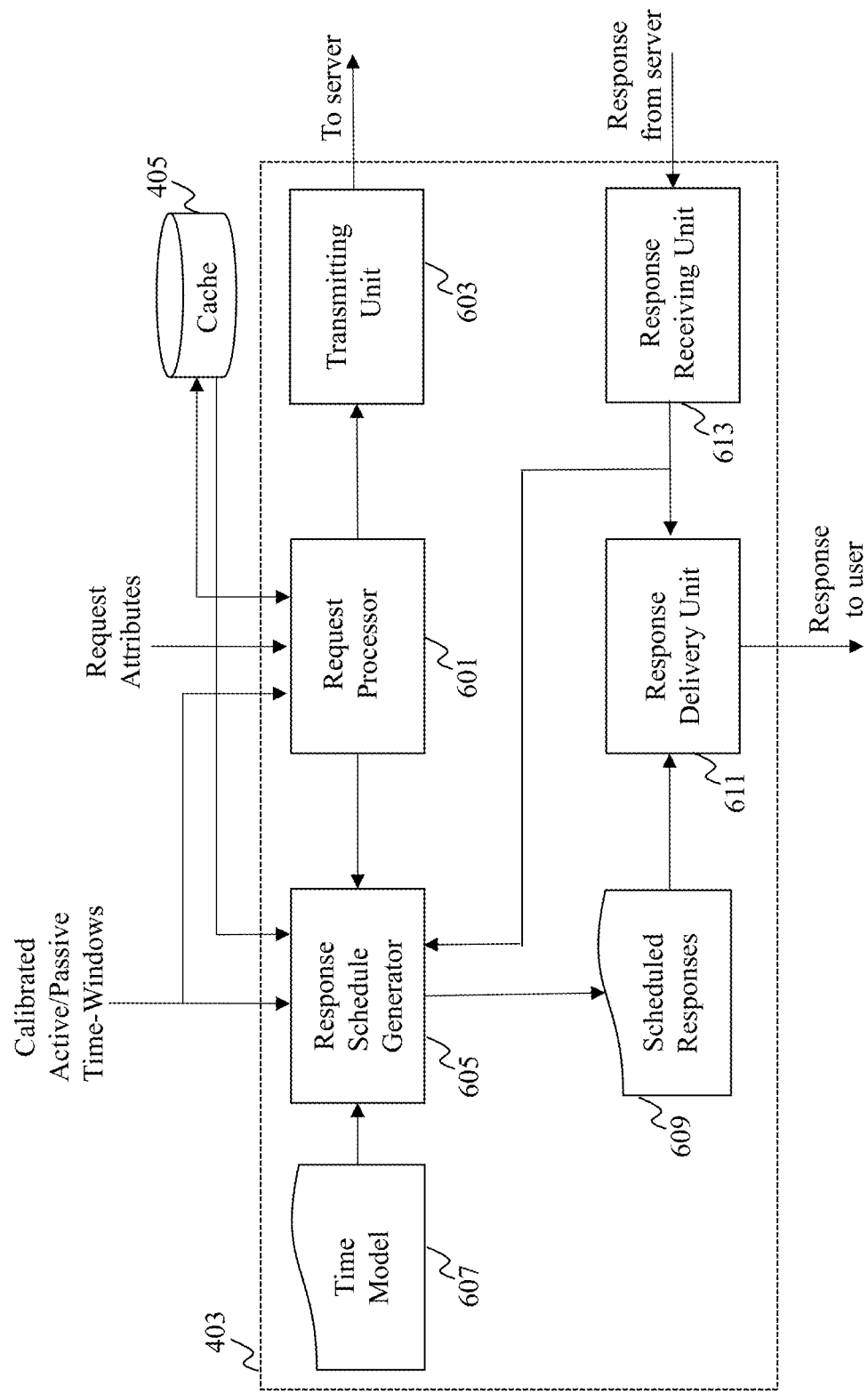
FIG. 6A depicts an exemplary request processing unit of an abuse detection system, in accordance with various embodiments of the present teaching.

Turning to FIG. 6A, there is depicted an exemplary request processing unit 403 of the abuse detection system 203, in accordance with various embodiments of the present teaching. The request processing unit 403 includes a request processor 601, a transmitting unit 603, a response schedule generator 605, a response delivery unit 611, and a response receiving unit 613. The request processor 601 receives calibrated active and passive time windows from the time-window calibration unit 407 of the abuse detection system 203. Further, the request processor 601 receives from the request handling unit 301, attributes of the request such as the ID of the request, a time-window in which the request is received, and an indicator representing whether the request is a functionally equivalent request.

The request processor 601 processes the received attributes of the request and forwards the request to the transmitting unit 603 for transmitting the request to the server in response to the request not being a functionally equivalent request, and being received in either the active or passive time-window. By one embodiment, if the request is received in the passive time-window and the request is a functionally equivalent request with respect to at least one previously received request, the request processor 601 forwards the request to the transmitting unit 603, for transmitting the request to the server.

If the request is received in the active time-window and the request is a functionally equivalent request with respect to at least one previously received request, the request processor 601 does not forward the request to the transmitting unit 603 for transmitting the request to the server. In this case, by one embodiment, depending on whether a response to a first occurrence of the at least one previously received request has been delivered to the user, the request processor 601 may either store the request in the cache 405 or forward the request to the response schedule generator 605.

By one embodiment, if the response to the first occurrence of the at least one previously received request has been delivered to the user, the request processor 601 forwards the request to the response schedule generator 605, which is configured to generate a scheduled response for the request as described below. However, if the response to the first occurrence of the at least one previously received request has not yet been delivered to the user, the request processor 601 stores the request in the cache 405. In this case, when the response to the first occurrence of the at least one previously received request is received by the response receiving unit 613, the response schedule generator 605 extracts the stored request (i.e., the current request and possibly other intermediate functionally equivalent requests) from the cache and generates a schedule response(s) to deliver to the user. Specifically, the response receiving unit 613 is configured by one embodiment, to receive a response of the request from the sever. Upon receiving the response, the response receiving unit 613 forwards the response to the response delivery unit 611, which is configured to deliver the response to the user. Upon receiving the response corresponding to the request, the response receiving unit 613 also triggers the response schedule generator 605 to extract all functionally equivalent requests (i.e., subsequent requests which are similar to the first occurrence of the request and received in the active time-window) from the cache 405. Note that the subsequently received similar requests in the active time-window are not transmitted to the server, but rather maintained in the cache 405.

By one embodiment, the response schedule generator 605 utilizes a time model 607 to generate scheduled responses 609 for the functionally equivalent requests received in the active time-window and which were not transmitted to the server. For example, the response schedule generator 605 may generate, using the time model 607, exponentially delayed responses for the functionally equivalent requests and forward the delayed responses to the response delivery unit 611 for transmitting the responses to the user. An example depicting the transmission of responses to the user is described later with reference to FIG. 7

Figure 6B:
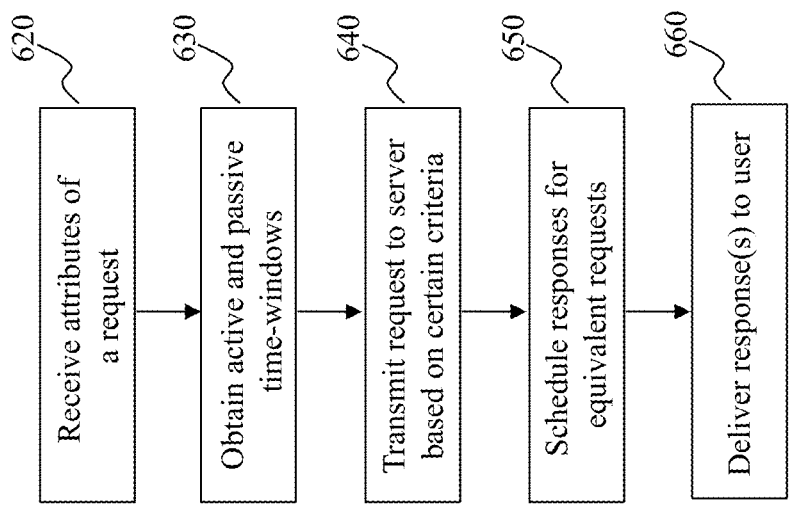
FIG. 6B depicts an illustrative flowchart of an exemplary process performed by the request processing unit, in accordance with an embodiment of the present teaching.

FIG. 6B depicts an illustrative flowchart of an exemplary process performed by the request processing unit 403, in accordance with an embodiment of the present teaching. In step 620, the request processing unit receives attributes of a request from the request handling unit 401. In step 630, the request processing unit 403 obtains calibrated active time-window and passive time window from the time-window calibrating unit 407.

In step 640, the request processing unit 403 transmits the request to a server based on criteria associated with the request. By one embodiment, in order to determine whether the request is to be transmitted to the server, the request processing unit evaluates a first criterion associated with the request based on an identifier of the request. Specifically, the request processing unit evaluates whether the request is a functionally equivalent request with respect to a previously received request, based on the identifier associated with the request being the same as the identifier associated with the previous request. Further, the request processing unit transmits the request to the server based on a second criterion related to a time-window in which the request is received and the first criterion.

For instance, in the case that the request is not a functionally equivalent request with respect to a previously received request, and the request is received in either the active time-window or the passive time-window, the request processing unit 403 transmits the request to the server. In the case that the request is a functionally equivalent request (i.e., similar request) and the request is received in the active time-window, then the request processing unit 403 does not transmit the request to the server. However, in the case that the request is a functionally equivalent request (i.e., the request violates the first criterion) and is received in the passive time-window, then the request processing unit 403 transmits the request to the server.

The process in step 650 generates a scheduled response for the functionally equivalent requests in accordance with a time model. For example, as stated previously, the response scheduling unit may exponentially delay responses corresponding to all functionally equivalent requests. Further, in step 660, the response(s) to the request and its functional equivalents are delivered to the user.

Figure 7:
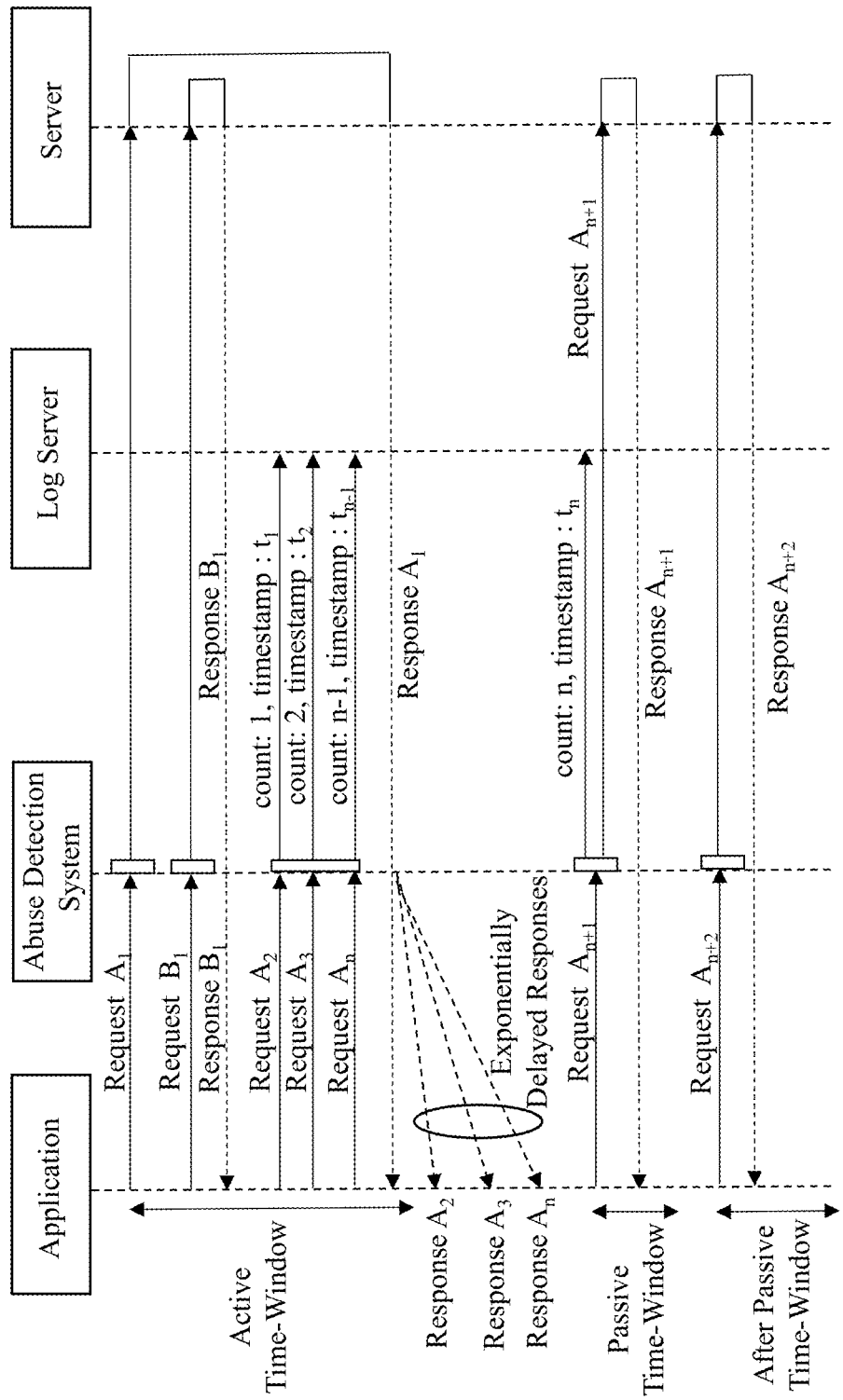
FIG. 7 is a timing diagram illustrating exemplary communication between an application, an abuse detection system and a server, according to an embodiment of the present teaching.

FIG. 7 is a timing diagram illustrating exemplary communication between an application, an abuse detection system and a server, according to an embodiment of the present teaching. For sake of convenience, only two types of requests (request type A and request type B) are depicted. Request $A_1$ is a first occurrence of the request type A, whereas request $B_1$ is a first occurrence of request type B. Thus, requests $A_1$ and $B_1$ are not functionally equivalent requests. Further, as shown in FIG. 7, requests $A_2, A_3 \ldots A_n$, $A_{n+1}$, and $A_{n+2}$ are similar to request $A_1$ and thus are functionally equivalent requests of request $A_1$.

As shown in FIG. 7, request $A_1$ is received by the abuse detection system in an active time window. As request $A_1$ is not a functionally equivalent request with respect to any other requests, the abuse detection system transmits request $A_1$ to the server. In a similar manner, the abuse detection system transmits request $B_1$ to the server. Upon receiving a response for request $B_1$, the abuse detection system transmits the response (Response $B_1$) to the application.

As depicted in FIG. 7, prior to the abuse detection system receiving a response for request $A_1$, the abuse detection system receives requests $A_2, A_3 \ldots A_n$. As these requests are received in the active time window and are all functionally equivalent requests of request $A_1$, the abuse detection system does not transmit these requests to the server. Rather, the abuse detection system maintains records of these requests (i.e. functionally equivalent requests) in a log server (i.e., a debug server). Specifically, as shown in FIG. 7, each record associated with the functionally equivalent request includes a timestamp at which the request was received and a count value indicating a number of the functionally equivalent requests that are received by the abuse detection system. For example, count value of two corresponding to request $A_3$ indicates that request $A_3$ is the second functionally equivalent request of type A received by the abuse detection system.

Further, when the abuse detection system receives a response for request $A_1$ (depicted as response $A_1$), the abuse detection system transmits the response to the application. Moreover, responses for requests $A_2, A_3 \ldots A_n$ are scheduled and delivered to the application. For example, as described previously with reference to FIG. 6A, the response schedule generator included in the abuse detection system may utilize a time model and generate exponentially delayed responses which are delivered to the application. In this manner, the abuse detection system prevents transmission of the functionally equivalent requests $(A_2, A_3 \ldots A_n)$ to the sever, while also ensuring that a response to each of these requests are delivered with a delay to the application. This prevents an API of the server from being overloaded with similar requests and also maintains the application in a functional state.

By one embodiment and as shown in FIG. 7, request $A_{n+1}$ is received in a passive time-window. Note that request $A_{n+1}$ is a functionally equivalent request with respect to request $A_1$. In such a case, the abuse detection system maintains a record in the log server for request $A_{n+1}$ but also transmits the request to the server. When a response corresponding to request $A_{n+1}$ is received by the abuse detection system, the response is forwarded to the application. Furthermore, as shown in FIG. 7, the abuse detection system receives request $A_{n+2}$ after expiration of the passive time window. In such a case, by one embodiment, the abuse detection system transmits the request $A_{n+2}$ to the server, and delivers the corresponding response to the application upon receiving the response from the server. As is described next, the abuse detection system utilizes the records of the functionally equivalent requests received in the active and passive time windows for calibration purposes.

Figure 8A:
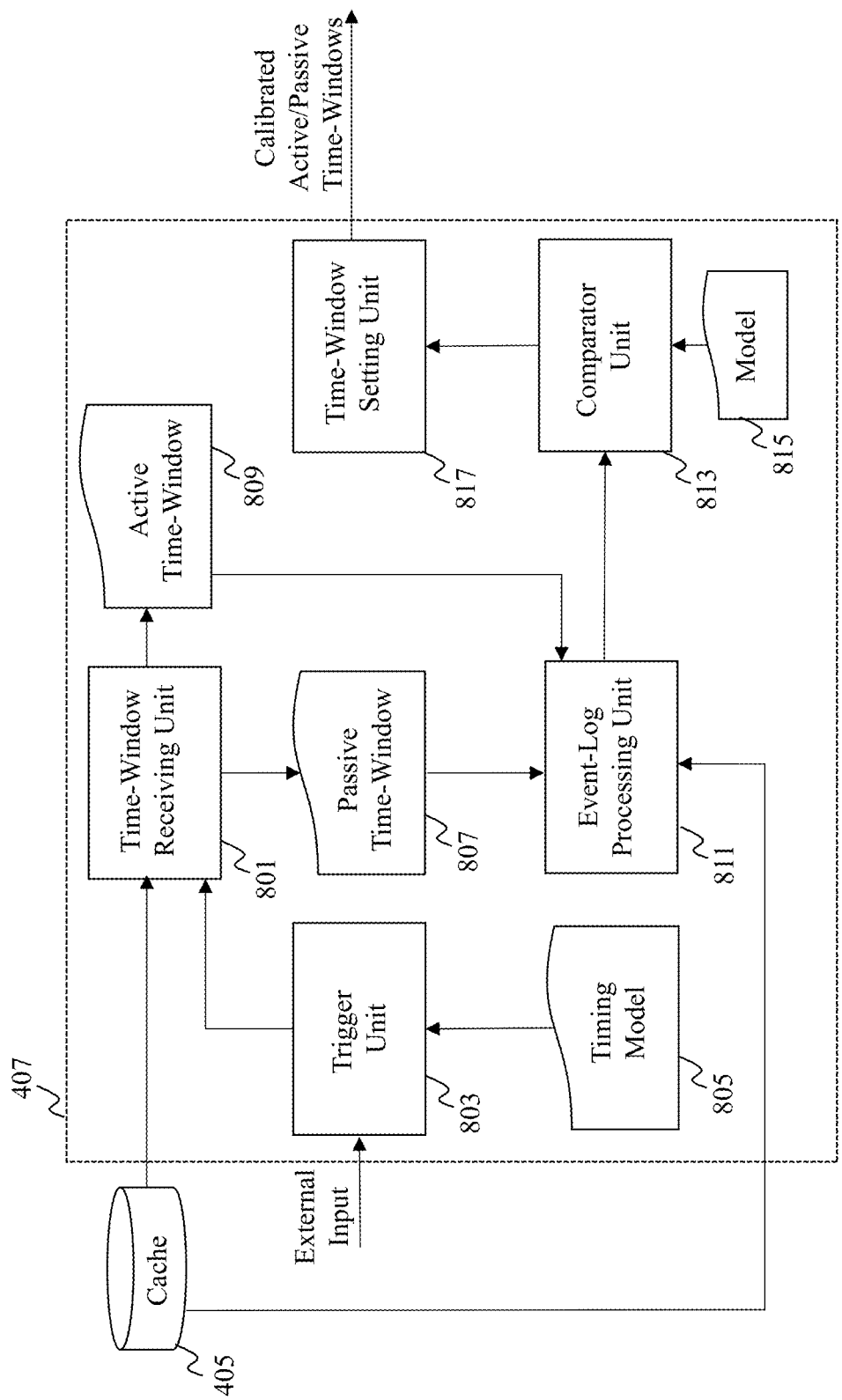
FIG. 8A depicts an exemplary time-window calibration unit of an abuse detection system, in accordance with various embodiments of the present teaching.

FIG. 8A depicts an exemplary time-window calibration unit 407 of the abuse detection system 203, in accordance with various embodiments of the present teaching. The time-window calibration unit 407 is configured to set a time duration for an active time-window and a passive time-window corresponding to an application executed on a device and from which the abuse detection system receives a plurality of requests e.g., unintentional requests such as those depicted in FIG. 3. The time-window calibration unit 407 includes a time-window receiving unit 801, a trigger unit 803, an event log processing unit 811, a comparator unit 813, and a time-window setting unit 817.

Upon receiving a trigger signal from the trigger unit 803, the time-window receiving unit 801 extracts from the cache 305, previously set time durations for the active time window 809 and the passive time-window 807 corresponding to the application. The trigger unit 803 may trigger the time-window receiving unit 801 in accordance with a timing model 805 or an external input received from a user.

Upon obtaining the previously set active and passive time-windows, the event-log processing unit 811 determines a number of functionally equivalent requests (i.e., similar requests) received in the active and passive time-windows, respectively. By one embodiment of the present teaching, the comparator unit 813 utilizes a model 815 to instruct the time-window setting unit 817 to set new time durations for the active and passive time-windows, respectively based on the determined number of functionally equivalent requests.

For instance, the comparator unit 813 may determine a ratio of the number of functionally equivalent requests received in the passive time-window 807 to the number of functionally equivalent requests received in the active time-window 809. Based on the determined ratio, the time window setting unit 817 may set new time durations for the active and passive time-windows. For example, consider that five functionally equivalent requests were received in the active time-window 809 of 30 msec, and thirty functionally equivalent requests were received in the passive time-window 807 of 50 msec. The comparator unit 813 may compare the ratio of the number of functionally equivalent requests received in the passive time-window 807 to the number of functionally equivalent requests received in the active time-window 809 (i.e., a ratio of six in the above example), to a predetermined threshold value of requests to determine new values of the active and passive time windows.

For instance, in the above example, since a relatively large number of requests were received in the passive time-window (as compared to the active time-window), the time-window setting unit 817 may set a larger value for the new active time-window (e.g., 80 msec) to prohibit functionally equivalent requests from being transmitted to the server. Additionally, the time-window setting unit 817 may maintain or increase the time duration for the passive time-window. In this manner, the time-window calibration unit 407 may calibrate the active and passive time-windows to improve efficiency of the abuse detection system by reducing the number of functionally equivalent requests from being transmitted to the server.

It must be appreciated that the time-window setting unit 817 is no way restricted to set the time durations for the new active and passive time-windows to only the mechanism described above. In one instance, the time-window setting unit 817 may set time durations for the active time window based on comparing only the number of functionally equivalent requests received in the passive time-window to a threshold value of requests. The newly calibrated active and passive time window durations are stored in the cache 405 and transmitted to the request handling unit 401 and the request processing unit 403 of the abuse detection system 203.

Figure 8B:
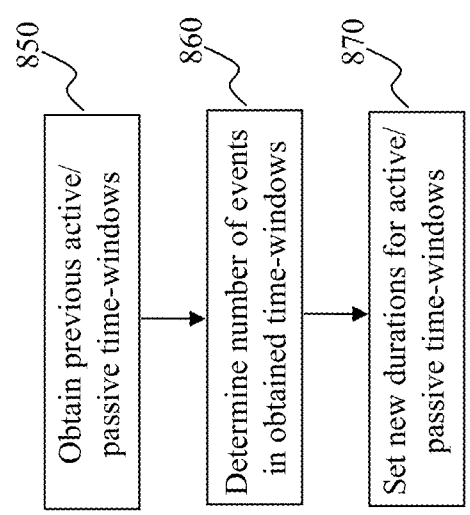
FIG. 8B depicts an illustrative flowchart of an exemplary process performed by the time-window calibration unit, in accordance with an embodiment of the present teaching.

FIG. 8B depicts an illustrative flowchart of an exemplary process performed by the time-window calibration unit 407, in accordance with an embodiment of the present teaching. The process commences in step 850, wherein the time window calibration unit 407 obtains previously set time-durations of the active time-window and the passive time-window, respectively. In step 860, the time-window calibration unit 407 determines a number of functionally equivalent requests that are received in the passive time-window and the active time-window, respectively. Further, in step 870, the time window calibration unit 307 sets new time-durations for the active and passive time windows in accordance with a model based on the number of functionally equivalent requests received in the active and/or passive time-windows as described above.

Figure 9:
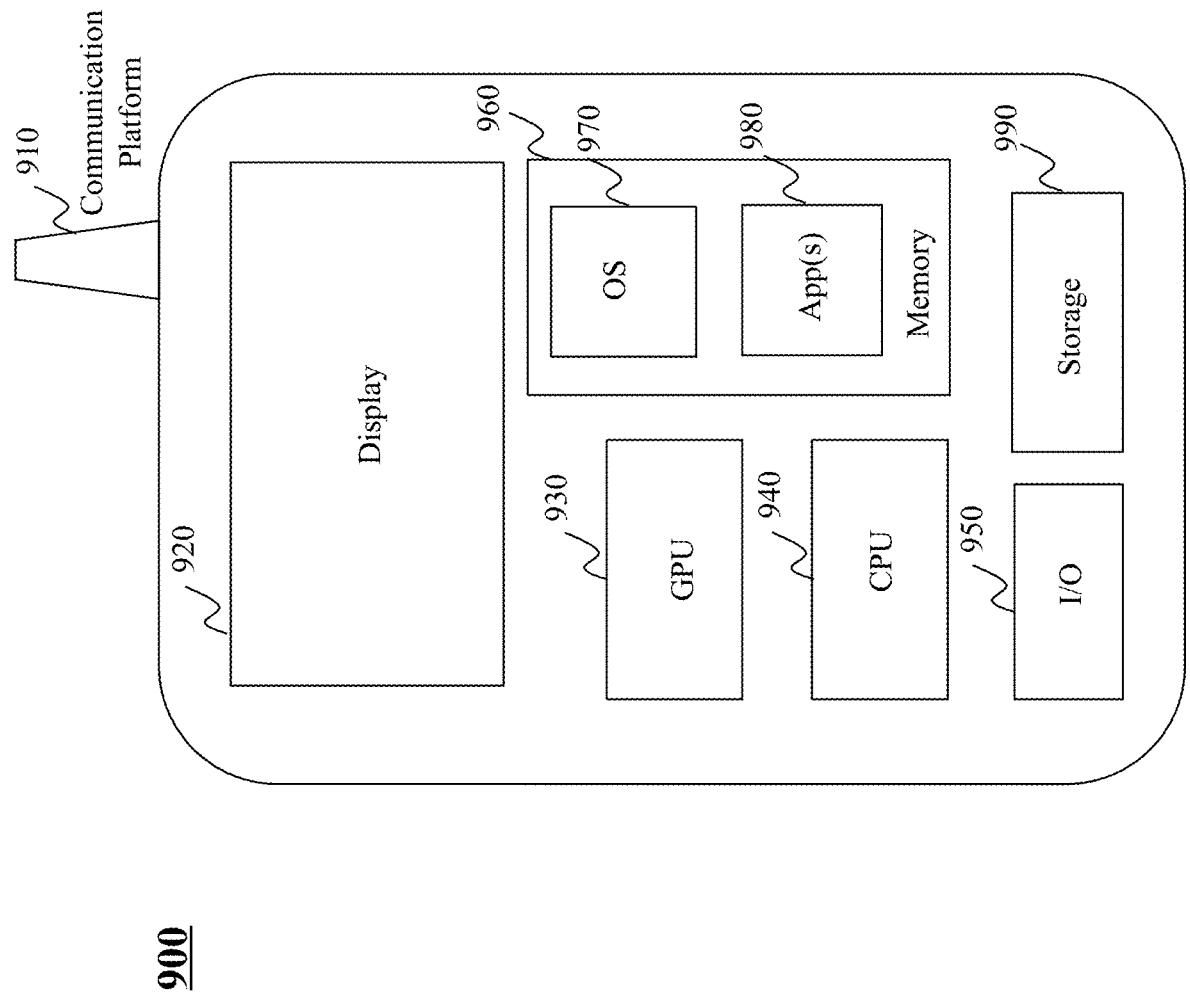
FIG. 9 depicts an architecture of a mobile device which can be used to implement a specialized system incorporating the present teaching.

Turning now to FIG. 9, there is depicted an architecture of a mobile device 900 which can be used to realize a specialized system implementing the present teaching. In this example, a user device on which the functionalities of the abuse detection system 203 as described herein can be implemented is a mobile device 900, including, but not limited to, a smart phone, a tablet, a music player, a handled gaming console, a global positioning system (GPS) receiver, and a wearable computing device (e.g., eyeglasses, wrist watch, etc.), or in any other form factor.

The mobile device 900 in this example includes one or more central processing units (CPUs) 940, one or more graphic processing units (GPUs) 930, a display 920, a memory 960, a communication platform 910, such as a wireless communication module, storage 990, and one or more input/output (I/O) devices 950. Any other suitable component, including but not limited to a system bus or a controller (not shown), may also be included in the mobile device 900. As shown in FIG. 9, a mobile operating system 970, e.g., iOS, Android, Windows Phone, etc., and one or more applications 980 may be loaded into the memory 960 from the storage 990 in order to be executed by the CPU 940. The applications 980 may include a browser or any other suitable mobile apps for performing the various functionalities of the abuse detection system on the mobile device 900. User interactions with the content displayed on the display panel 920 may be achieved via the I/O devices 950.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to explore abuse detection functionalities. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 10:
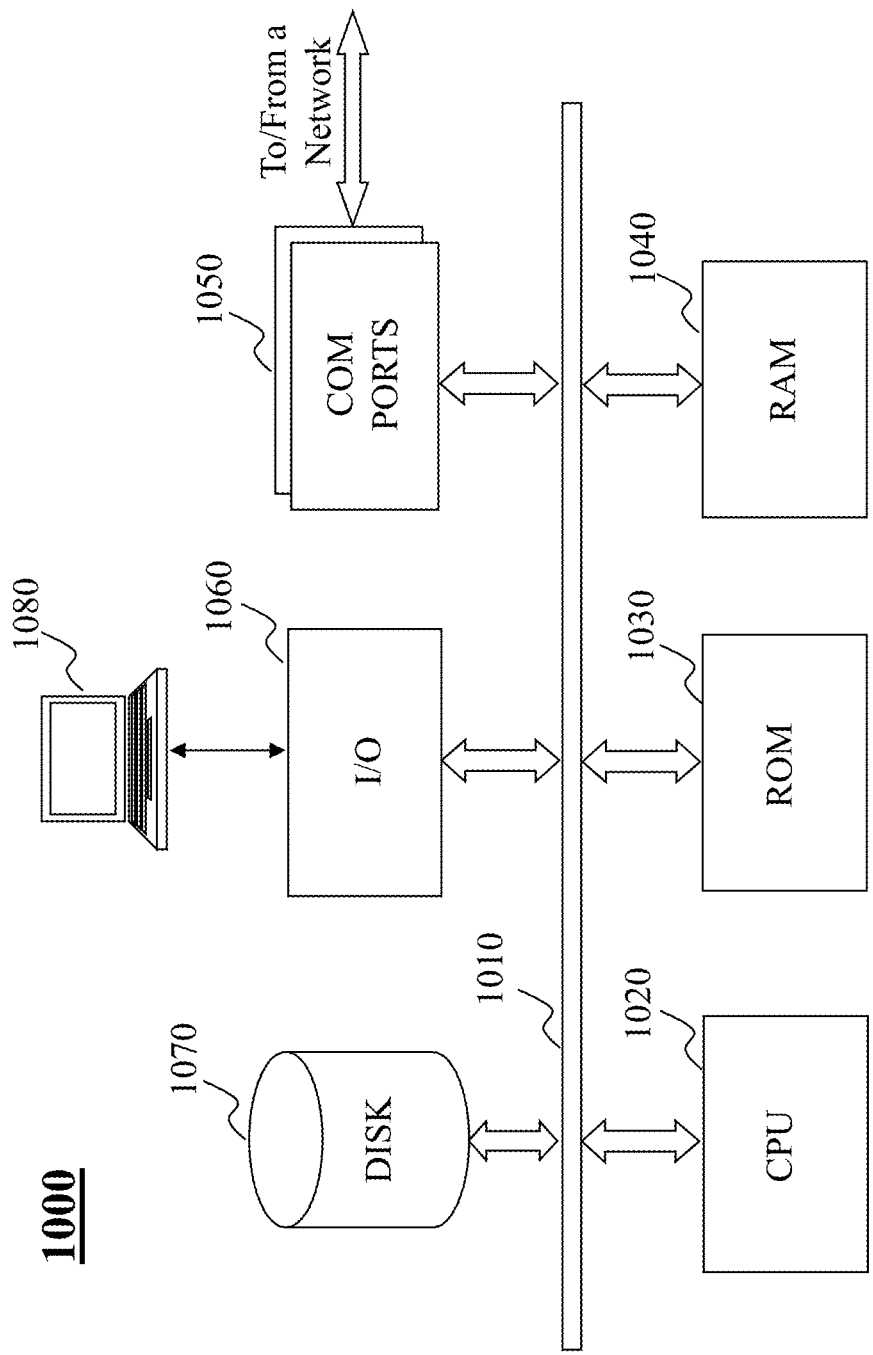
FIG. 10 depicts the architecture of a computer which can be used to implement a specialized system incorporating the present teaching.

FIG. 10 is an illustrative diagram of an exemplary computer system architecture, in accordance with various embodiments of the present teaching. Such a specialized system incorporating the present teaching has a functional block diagram illustration of a hardware platform which includes user interface elements. Computer 1000 may be a general purpose computer or a special purpose computer. Both can be used to implement a specialized system for the present teaching. Computer 1000 may be used to implement any component of the abuse detection system, as described herein. For example, the abuse detection system 203 may be implemented on a computer such as computer 1000 via its hardware, software program, firmware, or a combination thereof. Although only one such computer is shown, for convenience, the computer functions relating to abuse detection system for detecting functionally equivalent requests as described herein may be implemented in a distributed fashion on a number of similar platforms, to distribute the processing load.

Computer 1000, for example, may include communication ports 1050 connected to and from a network connected thereto to facilitate data communications. Computer 1000 also includes a central processing unit (CPU) 1020, in the form of one or more processors, for executing program instructions. The exemplary computer platform may also include an internal communication bus 1010, program storage and data storage of different forms (e.g., disk 1070, read only memory (ROM) 1030, or random access memory (RAM) 1040), for various data files to be processed and/or communicated by computer 1000, as well as possibly program instructions to be executed by CPU 1020. Computer 1000 may also include an I/O component 1060 supporting input/output flows between the computer and other components therein such as user interface elements 1080. Computer 1000 may also receive programming and data via network communications.

Hence, aspects of the methods for detecting abuse scenarios as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of abuse detection system into the hardware platform(s) of a computing environment or other system implementing a computing environment or similar functionalities in connection with abuse detection. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the abuse detection system, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform capable of connecting to a network for reducing request traffic directed to a server, the method comprising:
   receiving a request associated with an application;
   generating an identifier to be associated with the request based on content thereof;
   determining, based on the identifier associated with the request and an identifier associated with a previously received request, whether the request is similar to the previously received request;
   determining whether the request is received within a first time-window from the time the previously received request is received; and
   if the request is similar to the previously received request and is received within the first time-window, blocking the request from being transmitted to the server.

2. The method of claim 1, wherein the step of determining whether the request is similar to the previously received request comprises determining whether the identifier associated with the request is the same as the identifier associated with the previously received request.

3. The method of claim 1, further comprising:
   if the request is not similar to the previously received request, transmitting the request to the server.

4. The method of claim 1, further comprising:
   if the request is similar to the previously received request and is received in a second time-window following the first time-window, transmitting the request to the server.

5. The method of claim 4, wherein a duration of the first time-window is calibrated based at least on a number of requests received in the second time-window that are similar to the previously received request.

6. The method of claim 1, further comprising:
transmitting, with an exponential delay, a response associated with the request to the application based on receiving the request in the first time-window and the request being similar to the previously received request.

7. The method of claim 1, wherein the request is an unintentional request caused by one of a hardware malfunction of a device on which the application is being executed, an accidental user interaction with the device, and a bug in the application.

8. A system for reducing request traffic directed to a server, the system comprising:
a request handling unit implemented by a processor and configured to:
receive a request associated with an application,
generate an identifier to be associated with the request based on content thereof,
determine, based on the identifier associated with the request and an identifier associated with a previously received request, whether the request is similar to the previously received request, and
determine whether the request is received within a first time-window from the time the previously received request is received; and
a request processing unit implemented by the processor and configured to:
if the request is similar to the previously received request and is received within the first time-window, block the request from being transmitted to the server.

9. The system of claim 8, wherein the request handling unit is implemented by the processor and further configured to determine whether the identifier associated with the request is the same as the identifier associated with the previously received request.

10. The system of claim 8, wherein the request processing unit is implemented by the processor and further configured to:
if the request is not similar to the previously received request, transmit the request to the server.

11. The system of claim 8, the request processing unit is implemented by the processor and further configured to:
if the request is similar to the previously received request and is received in a second time-window following the first time-window, transmit the request to the server.

12. The system of claim 11, wherein a duration of the first time-window is calibrated based at least on a number of requests received in the second time-window that are similar to the previously received request.

13. The system of claim 8, wherein the request processing unit is further configured to:
transmit, with an exponential delay, a response associated with the request to the application based on receiving the request in the first time-window and the request being similar to the previously received request.

14. The system of claim 8, wherein the request is an unintentional request caused by one of a hardware malfunction of a device on which the application is being executed, an accidental user interaction with the device, and a bug in the application.

15. A non-transitory computer readable medium including computer executable instructions, wherein the instructions, when executed by a computer, cause the computer to perform a method for reducing request traffic directed to a server, the method comprising:
receiving a request associated with an application;
generating an identifier to be associated with the request based on content thereof;
determining, based on the identifier associated with the request and an identifier associated with a previously received request, whether the request is similar to the previously received request;
determining whether the request is received within a first time-window from the time the previously received request is received; and
if the request is similar to the previously received request and is received within the first time-window, blocking the request from being transmitted to the server.

16. The non-transitory computer readable medium of claim 15, wherein the step of determining whether the request is similar to the previously received request comprises determining whether the identifier associated with the request is same as the identifier associated with the previously received request.

17. The non-transitory computer readable medium of claim 15, wherein the instructions, when executed by the computer, cause the computer to further perform:
if the request is not similar to the previously received request, transmitting the request.

18. The non-transitory computer readable medium of claim 15, wherein the instructions, when executed by the computer, cause the computer to further perform:
if the request is similar to the previously received request and is received in a second time-window following the first time-window, transmitting the request to the server.

19. The non-transitory computer readable medium of claim 18, wherein a duration of the first time-window is calibrated based at least on a number of requests received in the second time-window that are similar to the previously received request.

20. The non-transitory computer readable medium of claim 15, wherein the request is an unintentional request caused by one of a hardware malfunction of a device on which the application is being executed, an accidental user interaction with the device, and a bug in the application.

* * * * *